United States Patent Office 3,773,871
Patented Nov. 20, 1973

3,773,871
METHOD FOR FORMING IMPLANTABLE CAPSULES WITH SILICONE RUBBER
Edward W. Merrill, Cambridge, Mass., assignor to Hans H. Estin, Leonard W. Cronkhite, Jr., and William W. Wolbach, trustees of the Charles River Foundation
Filed Nov. 19, 1971, Ser. No. 200,560
Int. Cl. B29c 24/00
U.S. Cl. 264—22                                     10 Claims

ABSTRACT OF THE DISCLOSURE

A capsule filled with a medicament is formed by first selectively cross-linking with ionizing radiation a silicone composition to form a cross-linked recess surrounded by uncross-linked silicone. The recess then is filled with medicament. The uncrosslinked portion is joined, either with itself or with the uncrosslinked portion of a mating, partially crosslinked section and subjecting just the uncrosslinked portion to ionizing radiation to effect crosslinking thereof.

---

This invention relates to a process for encapsulated solid or liquid materials, particularly drugs and other therapeutic reagents which can be effused through the encapsulating material.

Encapsulated drugs and processes for making the same have taken almost innumerable forms, including mating cylindrical shells mechanically pressed one inside the other, gelatin capsules made from hemispheres of gelatin to encapsulated fish liver oils, and capsules made by dipping solid drugs in suitable solutions whereby a temporary coating is applied sufficiently strong to contain the drug in a package. Frequently, the capsules are intended to disintegrate upon exposure to gastric or intestinal fluids.

Recently it has been found that certain drugs such as estrogen will diffuse through elastomeric materials, such as silicone rubber, and that such drugs may be administered continuously and gradually over long periods of time by encapsulating them in the elastomer and implanting the capsule in the patient (see Long & Folkman, U.S. Pat. No. 3,279,996). It is obviously essential that the walls of the capsules intended for implantation for the delivery of hormones, for example, have long-term stability of their diffusive properties and of their mechanical properties and above all that the capsules, with 100% certainty, are assured of being free of leaks lest the contained drug escape too rapidly after implantation thereby causing hazard to the health of the patient.

Capsules suitable for implantation are usually made with a shell comprising elastomeric materials which are cross-linked ("vulcanized") in order to endow them with elastic adaptability while retaining their permeability properties. Accordingly, it is customary to use elastomeric polymers capable of being subsequently cross-linked by suitable chemical means, usually with heating required. Suitable elastomeric polymers are the polymers of isoprene, butadiene, siloxane (silicone rubber), and co- or ter-polymers of ethylene, propylene, isobutylene and isoprene, butadiene and styrene, butadiene and acrylonitrile, and many others. Regardless of the cross-linking agent employed such as sulfur, peroxides or other vulcanizing agents, elevated temperature levels for significant periods of time are usually required to obtain the desired degree of cross-linking. Temperatures in excess of 150° and times usually in excess of 15 minutes, are typical of the conditions employed for cross-linking and represent a combination of conditions under which most pharmaceutical products intended for gradual release would be destroyed, denatured or partially decomposed with evolution of toxic side products. Thus, it is undesirable to form a capsule of unvulcanized elastomer around the pharmaceutical product and then vulcanize the elastomeric shell.

One means for avoiding high temperature vulcanization is to take advantage of easily provoked chemical reactions at room temperature. For example, a class of silicone rubbers, the ends of whose molecules in their fluid form have been capped by trifunctional acetoxy groups can be vulcanized at room temperature (RTV). When exposed to air containing moisture at room temperature, the acetoxy groups are hydrolyzed to release acetic acid and form silanol groups which then immediately react by condensation to form a three-dimensional siloxane network. During the self-vulcanization, the acidity necessarily is increased to levels which might readily denature most drugs and pharmaceutical products contained in capsules of this type.

It is also possible to form elastomeric capsules of any desired shape while leaving a hole in the wall thereof so that after complete vulcanization and other processing, the capsule may be filled with a drug via a hollow needle. However, this introduces problems attendant with the subsequent plugging of the hole and demonstrating that the hole has been effectively and permanently plugged. When the hole is not totally plugged, the drug will release at an undesirably rapid rate and/or the capsules will become unfit for use due to the introduction of foreign matter therein.

Furthermore, ionizing radiation is a presently available alternative to cross-link certain polymers. However, the radiation that creates the chemical effect in the elastomer would necessarily interact adversely with a contained pharmaceutical product.

While the present invention is described in detail with reference to a method for encapsulating drugs, it is to be understood that the process of this invention is useful for filling capsules with any solid or liquid material. The present invention provides capsules having a continuous flawless wall comprising a cross-linked elastomeric material free from materials which degrade the encapsulated medicament or drug. The capsules are formed so that they are free from holes and so that the encapsulated drug retains its efficacy.

This invention provides a process whereby a silicone composition is shaped and selectively cross-linked with ionizing radiation to form an unfinished capsule having a cross-linked portion and an uncrosslinked portion. The cross-linked portion is shaped to form a recess into which a medicament can be placed through an opening to the recess. The uncross-linked portion is attached to the crosslinked portion and surrounds the opening. The uncrosslinked portion is joined to close the opening after the recess is filled with medicament so that the joined uncrosslinked portions intercoalesce. The uncrosslinked portion then is selectively subjected to ionizing radiation to effect crosslinking while shielding the previously crosslinked portion and medicament.

Even though the process of this invention involves a two-step cross-linking procedure, the capsules produced thereby have strength characteristics equal to those of capsules made by a one-step cross-linking procedure. However, as noted above, the one-step cross-linking procedure cannot be employed since the risk of degrading encapsulated medicament is greatly increased thereby. By the same token, capsules made by joining cross-linked silicone surfaces by interposing an uncrosslinked silicone and subjecting the interposed silicone to ionizing radiation have been found to be unsatisfactory. Capsules produced by the latter method exhibit poor strength characteristics and are easily ruptured at the seam formed between the originally cross-linked silicone and the interposed silicone. It is believed that the desirable results obtained by this invention result from the fact that there is no well-defined interface between crosslinked and uncrosslinked silicone after the first crosslinking step. Rather, there is a gradient representative of the degree of crosslinking extending down to zero so that always there is at least a portion of the silicone adjacent opposing sides of the opening that can coalesce and be crosslinked to form a seamless capsule.

The invention will be more fully described with reference to the accompanying drawings.

Figure 1:
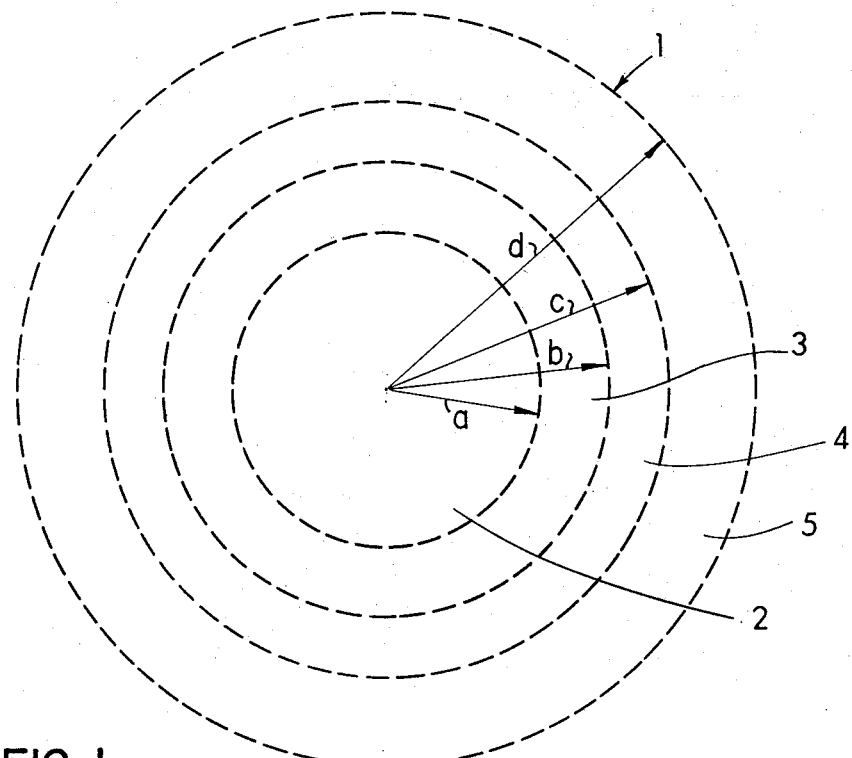
FIG. 1 is a top view of a circular silicone blank that could be shaped and crosslinked to mate with an identical blank to form a capsule.

Referring to the figures, a blank 1 used to form one half of a capsule comprises a circular disc prepared from a uniformly thick sheeted silicone gum stock which may or may not contain silica as a reinforcing filler. The disc is placed into an appropriately shaped mold (not shown) so that the area 2 defined by radius $a$, comprises a depression having a radius curvature such as to contain half the desired ultimate quantity of medication. The remaining portion of the blank 1 outside of the radius $a$ is maintained flat. The thusly molded disc is placed under a metal shield (not shown) which covers the area of blank 1 from radius $b$, to the outer radius $d$. The shielded disc then is exposed at its interior portions up to the radius, $b$, to direct ionizing radiation, as for example from a Van der Graaf generator, so as to give a maximum dosage of about 10 megarads, although higher or lower doses may be employed depending upon the polymer being cross linked. Thus, direct radiation is applied to curved area 2 and flat area 3. The silicone in area 4 defined between radii $b$ and $c$ has a degree of cross linking extending from a maximum corresponding to 10 megarads down to zero, this being the result of side scatter of the radiation, especially in radiation from a Van der Graff generator. All the material in area 5 between radii $c$ and $d$ is completely uncrosslinked. After the blank has been crosslinked as described above, it is removed from the mold and the shielding apparatus and then transferred to a filling step. In the filling step, the hollowed blanks are filled with an amount of medicament 6 to fill the volume defined by the hollow central portion 2. The material added, by reason of an inert carrier or because of a finite cohesion is sufficiently sticky so that when pressed into the hollow area 2 of blank 1, it will not easily fall out or scatter under accidental mechanical forces.

Figure 2:
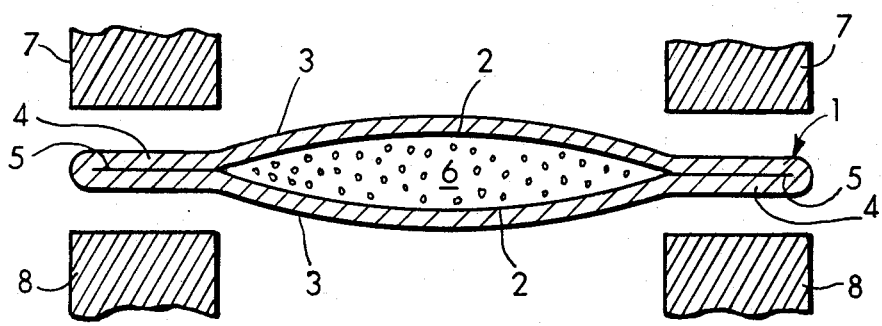
FIG. 2 is a side view in cross section of two silicone blanks being joined in a mold.
Figure 3:
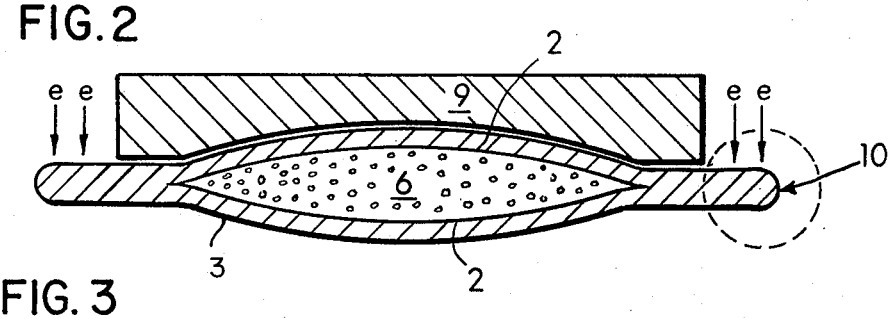
FIG. 3 is a cross-sectional view of a capsule prepared by the process of this invention.

Following filling, assembly of the capsules is effected by combining, face-to-face, hollow side-to hollow side, two blanks formed as described above placed between two mating sections 7 and 8 of a mold shown in FIG. 2. The encapsulated medicament 6 is contained between the curved areas 2 of the blanks. Gentle pressure, or if necessary, heating to increase the plasticity of the silicone, is applied over the total area of areas 4 and 5 so that there is total coalescence between the silicone in area 5 and partial coalescence in area 4 depending upon the degree of cross linking in area 4. As shown in FIG. 3 after sufficient plastic flow has occurred for intra-coalescence or diffusion of the silicone macromolecules, molds 7 and 8 are removed and the areas 4 and 5 are exposed to ionizing radiation $e$ while the areas 3 and 2 are shielded by shield 9 so that radiation is completely prevented from striking the contained medicament 6. After the second exposure to radiation is completed, the area 5 and most of the area 4 have coalesced into the uniformly crosslinked seamless ring 10 surrounding the medicament 6. The resulting capsule 14 has a number of advantages including a high surface-to-volume ratio, is relatively easy to surgically implant and is easily adapted intramuscularly as an implant.

Suitable polymers that may be used include the homopolymers and interpolymers formed from difunctional disubstituted siloxanes, such as dimethyl siloxane, diethyl siloxane, vinyl methyl siloxane, vinylphenyl siloxane, methyl phenyl siloxane, and diphenyl siloxane: for example, poly[dimethyl siloxane], poly[dimethyl co-vinylmethyl siloxane], poly[dimethyl-co-phenylmethyl siloxane], and poly[dimethyl-covinylmethyl-co-phenylmethyl siloxane]. For best results, it is preferred to have a polymer of molecular weight 100,000 or more, containing fume silica as a reinforcing agent in an amount up to 60 weight percent, consisting of polydimethyl co-vinylmethylsiloxane with a vinyl content equal to about 5 mole percent of the methyl content. The fume silica also improves the rheological characteristics of the raw polymer by imparting a yield stress so that the uncrosslinked material, after shaping, may be more readily separated from molding surfaces, and more effectively resist sag or creep until completely crosslinked.

The fume silica or other material filler may be omitted for capsules where, by reason of their ultimate site in the body (in the gastrointestinal tract, in the peritoneal cavity, etc.), mechanical forces would be expected to be insufficient to rupture the capsule, and where very high permeability to the drug is required. When mineral filler is omitted, it is especially important to use polymer of moderately high molecular weight e.g. Stauffer-Wacker Silicone Corp. grade 06804 or 06093 in order to avoid excessive tackiness and softness during molding operations.

While the present invention has been described specifically with reference to capsules formed from two mating symmetrical portions, it is to be understood that the configuration of the partially crosslinked portion can vary widely. It is only necessary that the partially crosslinked capsule or capsule portion have an opening surrounded, at least in part, by uncross-linked silicone so that the partially crosslinked portion can be filled with medicament and the opening be subsequently sealed by intercoalescence and with ionizing radiation that does not contact the encapsulated medicament. For example, the partially cross-linked capsule can be spherically shaped and having an opening therein, which opening is surrounded by a flange-shaped portion extending radially from the sphere and formed from partially crosslinked and uncrosslinked silicone.

After the filled capsule is formed, it can be tested for integrity and strength by the process described in my copending application Ser. No. 860,196 filed Sept. 23, 1969 and entitled "Capsules and Method for Testing Capsules for Wall Integrity," now U.S. Pat. 3,678,756, issued July 25, 1972.

The following example illustrates the present invention and is not intended to limit the same.

A contraceptive drug delivery system was prepared for positioning in the uterus in the following way. Union Carbide silicone S–2000 U was sheeted into thin uniform sheets of 0.5 mm. thickness. Using appropriately bored lead plates with 5 mm. radius bored holes these sheets were exposed to 5 megarads of ionizing radiation under a 5 mev. Van der Graaf generator. Following this, discs were stamped out of the sheet concentric with the irradiated circular areas, these discs having a radius of 7.5 mm. Progesterone was compacted into wafers approximately .5 mm. thick and 4 mm. in radius. These wafers were positioned concentrically between two of the silicone circular pieces, so that the progesterone wafer was concentric with the previously irradiated circular surfaces of the silicone. The circular margins beyond a radius of 6 mm. were compressed under gentle pressure with a smooth warm die until complete coalescence of the uncrosslinked silicone has been effected. Following this step, lead rods of 6 mm. radius by 1.5 cm. height were positioned just above and concentric with the progesterone wafers to shield them, as well as the immediately contacting, previously crosslinked silicone, from further irradiation. These assemblies were then passed under a Van der Graaf 5 mev. generator so as to receive a dose of 5 megarads, by which complete crosslinking of the margins into a seamless structure was effected.

I claim:
1. The process for forming a crosslinked capsule filled with a material capable of effusing through crosslinked silicone which comprises:
   (a) crosslinking part of a silicone material with ionizing radiation so as to produce a crosslinked silicone portion while leaving an uncrosslinked silicone portion, said crosslinked portion forming a wall of a recess, said recess having an opening surrounded by said uncrosslinked portion;
   (b) placing a material capable of effusing through crosslinked silicone in the recess on the crosslinked portion,
   (c) joining a first area of the uncrosslinked portion to a second area thereof so that respective uncrosslinked areas mutually contact and coalesce to encapsulate said material capable of effusing through crosslinked silicone, and
   (d) crosslinking with ionizing radiation the uncrosslinked portion while preventing exposure of the effusable material to ionizing radiation to form a capsule of crosslinked silicone enclosing said material capable of effusing through crosslinked silicone.

2. The process of claim 1 wherein the silicone contains a non-toxic reinforcing filler.

3. The proces of claim 1 wherein the silicone comprises dimethyl co-vinylmethyl silicone.

4. The process for forming a crosslinked silicone capsule filled with a material capable of effusing through crosslinked silicone which comprises:
   (a) crosslinking part of a first silicone sheet with ionizing radiation so as to produce a crosslinked portion while leaving an uncrosslinked silicone portion, said crosslinked portion forming a wall of a first recess, said recess having an opening surrounded by said uncrosslinked portion,
   (b) filling said recess with a material capable of effusing through crosslinked silicone,
   (c) joining the first partially crosslinked sheet with a second partially crosslinked sheet having a crosslinked portion forming a wall of a second recess and said second recess having an opening surrounded by uncrosslinked silicone so that the respective uncrosslinked portions contact and intercoalesce and the respective crosslinked portions surround the effusable material, and
   (d) crosslinking the ionizing radiation the uncrosslinked portions of each sheet while preventing exposure of the effusable material to ionizing radiation to form a capsule of crosslinked silicone enclosing said material.

5. The process of claim 4 wherein the silicone contains a non-toxic reinforcing filler.

6. The process of claim 4 wherein the first and second sheet in the final crosslinking step each has a crosslinked recess surrounded by uncrosslinked silicone.

7. The process of claim 4 wherein the silicone comprises dimethyl co-vinylmethyl silicone.

8. The process for forming a crosslinked capsule filled with a material capable of effusing through crosslinked silicone which comprises:
   (a) crosslinking a silicone material with ionizing radiation so as to produce at least one region of crosslinked silicone while leaving uncrosslinked silicone surrounding each said region, at least one of said regions of crosslinked silicone forming a wall of a recess, said recess having an opening surrounded by said uncrosslinked silicone,
   (b) placing a material capable of effusing through crosslinked silicone in at least one of said recesses on the crosslinked silicone,
   (c) joining a first portion of said uncrosslinked silicone to a second portion thereof, to encapsulate said material capable of effusing through the crosslinked silicone, so that the respective uncrosslinked portions mutually contact and coalesce with each other,
   (d) crosslinking with ionizing radiation the uncrosslinked portion while preventing exposure of the effusable material to ionizing radiation to form a capsule of crosslinked silicone enclosing said material capable of effusing through crosslinked silicone.

9. The method of claim 8 in which said silicone material is in the form of a single piece including one said recess.

10. The method of claim 9 wherein said single piece is in the form of a sheet.

References Cited

UNITED STATES PATENTS

| | | | |
|---|---|---|---|
| 3,179,546 | 4/1965 | Fischer | 156—272 |
| 3,236,923 | 2/1966 | Degering | 264—22 |
| 3,325,330 | 6/1967 | Robb | 156—272 X |

ROBERT F. WHITE, Primary Examiner

W. E. HOAG, Assistant Examiner

U.S. Cl. X.R.

156—272, 306; 264—248, DIG. 37